No. 739,049. PATENTED SEPT. 15, 1903.
R. J. G. WOOD.
APPARATUS FOR TREATING AND UTILIZING SEWAGE.
APPLICATION FILED JAN. 17, 1903.
NO MODEL. 2 SHEETS—SHEET 1.
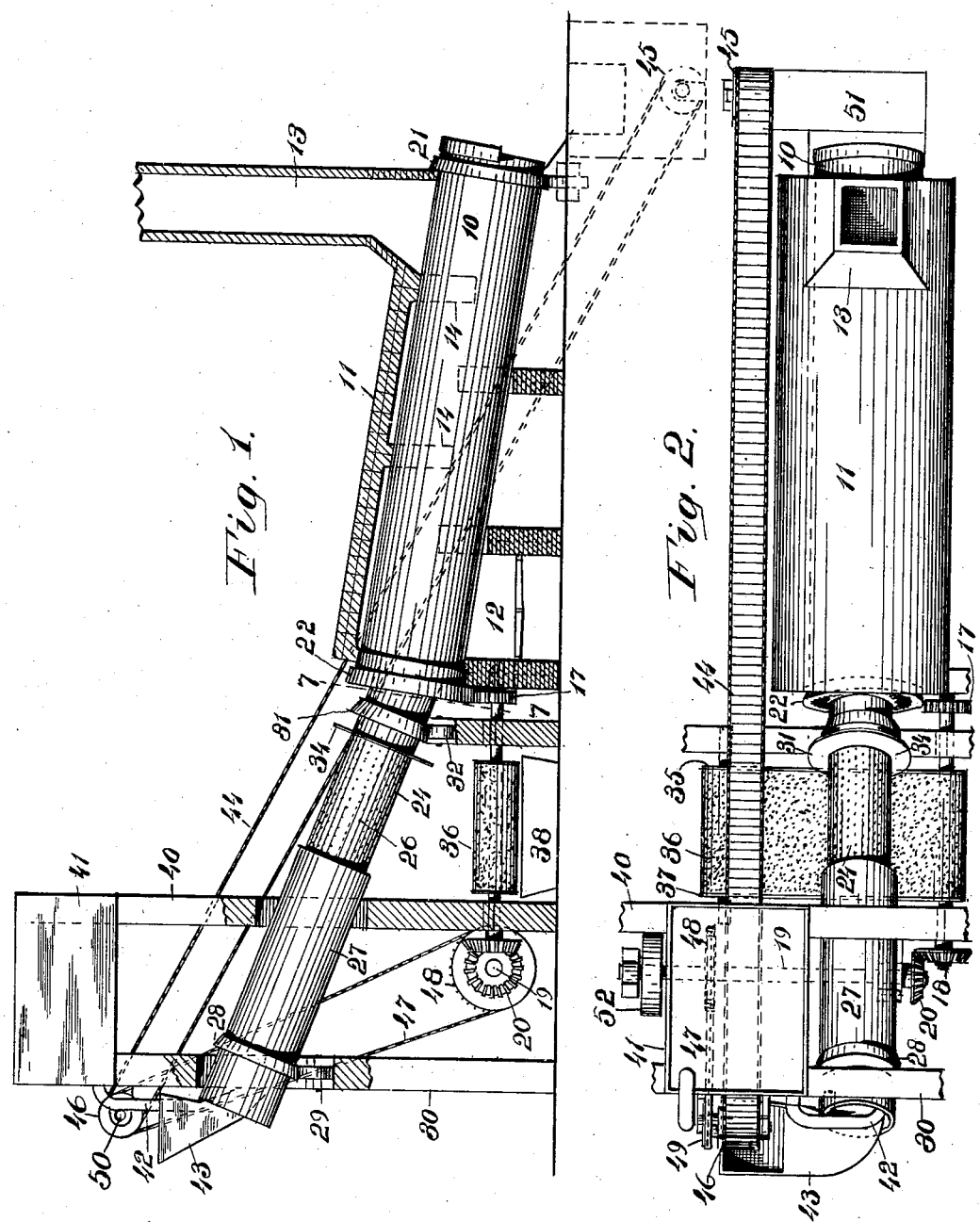
Witnesses:
A. Murray
Thomas Marx
Inventor:
R. J. G. Wood
By
Att'ys

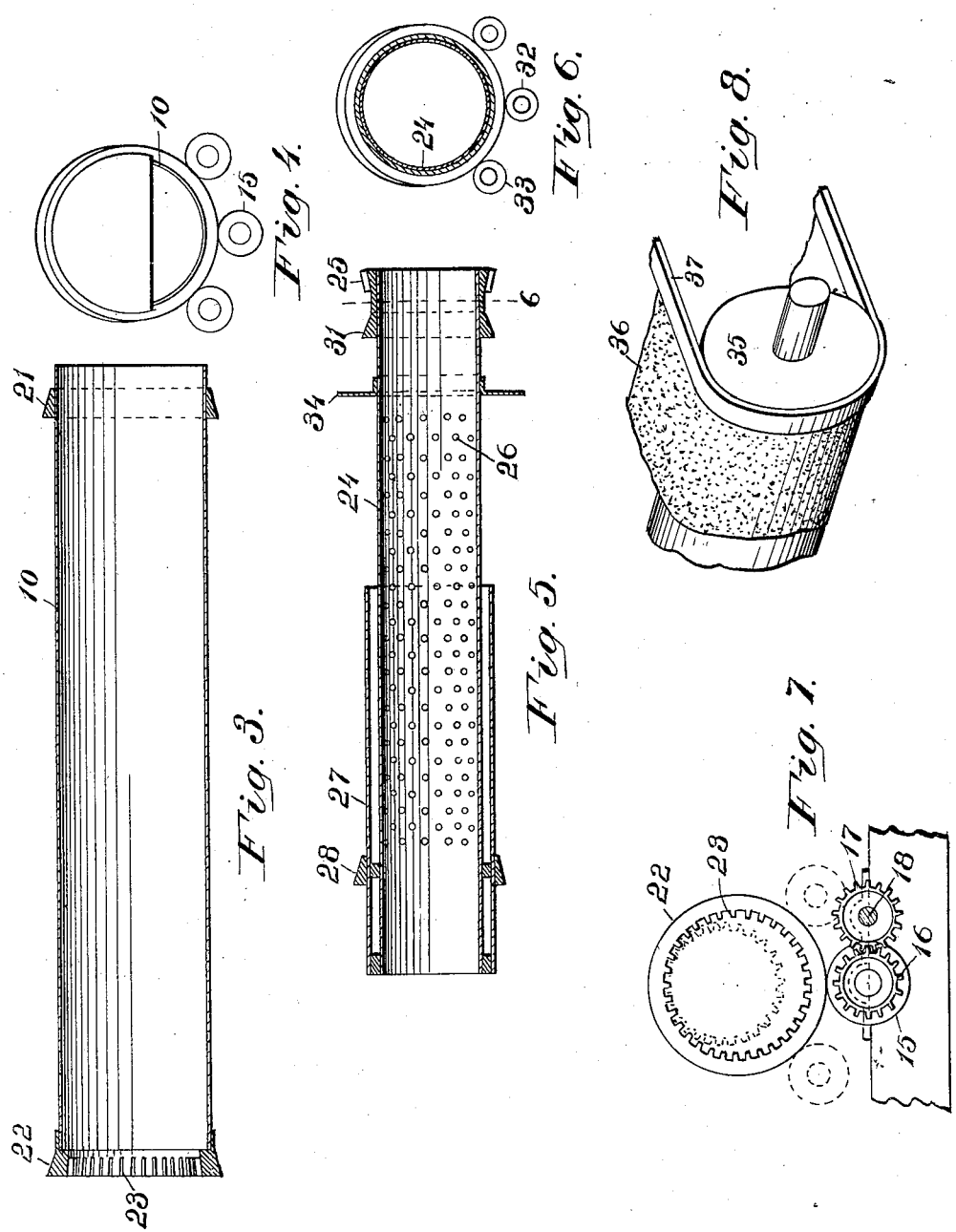

No. 739,049. Patented September 15, 1903.

UNITED STATES PATENT OFFICE.

ROBERT J. G. WOOD, OF LEONIA, NEW JERSEY.

APPARATUS FOR TREATING AND UTILIZING SEWAGE.

SPECIFICATION forming part of Letters Patent No. 739,049, dated September 15, 1903.

Application filed January 17, 1903. Serial No. 139,491. (No model.)

*To all whom it may concern:*

Be it known that I, ROBERT J. G. WOOD, a citizen of the United States, residing at Leonia, in the county of Bergen and State of New Jersey, have invented certain new and useful Improvements in Apparatus for Treating and Utilizing Sewage, of which the following is a specification.

The object of this invention is to provide an apparatus for treating and utilizing sewage; and it comprises a revoluble cylindrical shell mounted in an inclined position within a fire-brick wall or casing, having means for heating the same. At the upper end of this cylinder is a smaller filtering-cylinder with a greater inclination rotatable therewith and adapted to discharge therein, which cylinder is perforated throughout the greater portion of its length, and the upper end has a pipe to supply the liquid sewage and also a hopper whereby the solid matter may be returned from the lower end of the drying-cylinder for additional treatment. It also provides a traveling strainer and means whereby the liquid portion of the sewage may be transmitted from the filtering-cylinder to the strainer and the finely-divided solid matter eliminated therefrom, as will now be set forth in detail.

In the drawings, Figure 1 is a side elevation of my apparatus for treating and utilizing sewage; Fig. 2, a top or plan view of same; Fig. 3, a central vertical longitudinal section of the drying-cylinder; Fig. 4, a view of the front end of the drying-cylinder with its bearings; Fig. 5, a central vertical longitudinal section of the filtering-cylinder; Fig. 6, a vertical cross-section of the filtering-cylinder through line 6 of Fig. 5; Fig. 7, a view of rear end of the drying-cylinder along line 7 of Fig. 1, and Fig. 8 a perspective view of portion of the straining apparatus.

In constructing my invention I prepare a cylindrical shell 10, which is mounted within a brick casing 11, one end of which has a fire-box 12 and at its other end a chimney 13, this casing having within suitable diverting-walls 14, whereby the heat may be distributed along the entire cylinder in an efficient manner. The cylinder is inclined, as shown, its rear end being elevated above its front end a distance approximately equal to its diameter.

As shown in Fig. 7, it rests on a central bearing-wheel, the upper wheel 15 having alongside a pinion 16, which meshes with a similar pinion 17 on the shaft 18, this latter shaft being driven by a main shaft 19 through the medium of the bevel-gears 20.

The rear end of the drying-cylinder, as well as the front end, have inclined bearing-surfaces 21 22, the upper bearing-surface 22 having cast integral therewith internal teeth 23. The filtering-cylinder 24 is mounted so that its lower end enters the upper end of the drying-cylinder and has external teeth 25, which engage with the internal teeth 23 of the cylinder 10. This cylinder has perforations 26 throughout the greater portion of its length, and over the upper half of the cylinder is an external shell 27, provided near its upper end with an inclined bearing-surface 28, which rests on a wheel 29, mounted in the wall 30. The lower end of the cylinder 24 has an external bearing-surface 31, and, as shown more fully in Figs. 5 and 6, this bearing-collar is cast with the collar on which the teeth 25 are formed. The lower bearing-collar rests on a bearing-wheel 32, and guide or idler pulleys 33 are also provided to hold the cylinder in place.

Near the lower end of the filtering-cylinder 24 is a disk or annular rim 34, projecting out, the object of which is to divert the liquid from the cylinder to the straining apparatus beneath. This straining apparatus is comprised of two drums 35, one of which is mounted on the shaft 18 and driven therewith, and over these drums is placed a web 36, of fabric or of fine-wire mesh, as may be most suitable, a strengthening-band 37 being provided at each edge, as shown in Fig. 8. A receptacle 38 is placed beneath this strainer to catch or divert the liquid which passes through the strainer. It will be observed that the lower end of the outer shell 27 extends down to within range of the strainer, so that all the liquid entering the cylinder 24 and passing through the perforations 26 will be diverted to the strainer, so that the small particles will thus be strained from the liquid.

Mounted on the wall 30 40 is the reservoir 41, to which the sewage is pumped from the main reservoir. This has a pipe 42, which is adapted to discharge into the upper end of the filtering-cylinder 24. A hopper 43 is also provided above the end of this cylinder, the lower end of which discharges into the cylinder alongside of the pipe 42. The object of the hopper is to receive the dried or partially-dried solid matter from the lower end of the drying-cylinder, for which purpose an endless conveyer 44 is provided, which runs over a pulley 45 at the lower end of the cylinder 10 and over a similar pulley 46 above the hopper, the whole being driven by a sprocket-chain 47 over the sprocket-wheel 48 on the main shaft 19 and sprocket-wheel 49 on the shaft 50, which carries the upper wheel.

The lower end of the drying-cylinder 10 discharges its contents onto an inclined table or way 51, from which the solid matter or such of it as may be disused is placed on the conveyer for additional treatment through the drier.

The operation of the apparatus is as follows: Motion is imparted to the mechanism from the engine to the pulley 52 on the main shaft 19. This rotates the drying-cylinder and the filtering-cylinder in unison, as well as the strainer and the conveyer-belt. The liquid sewage passes from the reservoir 41 to the cylinder 24 through the pipe 42, and as the latter cylinder slowly turns the liquid portion passes through the perforations 26 and passes through the strainer 36, while the solid matter passes from the lower end of the cylinder 24 to the drier 10, and the latter being heated is finally discharged at the lower end of the cylinder. If in the process it should be found that the solid matter thus treated is not sufficiently dried, it can readily be returned to the upper end of the cylinders for second treatment.

I show only one form of the strainer or means for eliminating all solid matter from the liquid portion, as it is obvious that various means may be employed for this purpose without departing from the spirit of my invention. The liquid thus passing through the strainer may be disposed of by passing the same through contact-beds, whereby all soluble matter may be rendered pure and innocuous in the usual manner employed for this purpose. The advantage in first removing the vast body of suspended or solid matter before subjecting the liquid to the action of the contact-beds must be apparent, and from the profits derived from the utilization of the solid matter it enables me to treat a greater quantity of sewage with considerably less area of septic tanks or beds, the latter of which would otherwise have to destroy a large mass by putrefaction.

What I claim is—

1. An apparatus for treating and utilizing sewage, comprising a drying-cylinder, revolubly mounted in an inclined position in a casing, having in combination therewith a filtering-cylinder, said filtering-cylinder projecting within the upper end of the drying-cylinder and rotated thereby, and having means for receiving sewage and discharging same into said drying-cylinder.

2. An apparatus for treating and utilizing sewage, comprising a drying-cylinder, revolubly mounted in an inclined position, in a casing, and having means for heating same, in combination with a filtering-cylinder projecting into the end of said drying-cylinder, and rotated thereby, said filtering-cylinder being mounted at a greater inclination from the horizontal than the drying-cylinder, and having perforations, and means for receiving sewage and discharging same into the drying-cylinder.

3. An apparatus for treating and utilizing sewage, comprising a drying-cylinder revolubly mounted in an inclined position, in a casing, and having means for heating same, in combination with a filtering-cylinder, one end of which projects into the elevated end of the drying-cylinder, said filtering-cylinder being at a greater inclination than the drying-cylinder, a deflecting-disk near its lower end, and an exterior shell around its upper end, and provided with perforations along the central portions of said cylinder, and having means for receiving sewage at its upper end, and for discharging same into the drying-cylinder.

4. An apparatus for treating and utilizing sewage, comprising a drying-cylinder revolubly mounted in a casing, in an inclined position, with means for heating the same, in combination with a filtering-cylinder disposed at a greater angle than the drying-cylinder, said filtering-cylinder having its lower end projecting into and rotated by the drying-cylinder, said filtering-cylinder being perforated and having means for receiving sewage at its upper end, an exterior shell on the upper half of said cylinder, a strainer below the filtering-cylinder, and means for delivering the liquid sewage to the strainer, and the solid matter to the drying-cylinder, as set forth.

5. An apparatus for treating and utilizing sewage, comprising a drying-cylinder, revolubly mounted in an inclined position in a casing, and having means for heating same, in combination with a filtering-cylinder, one end of which rests in the upper end of the drying-cylinder, and rotates thereby, said filtering-cylinder being disposed at greater angle than the drying-cylinder, and having suitable perforations and means for supplying sewage to the same, a hopper at the upper end of said filtering-cylinder, and a conveyer from the discharge end of the drying-cylinder to said hopper, whereby the dried, or partially-dried solid matter may be conveyed back to the filtering-cylinder, as set forth.

6. An apparatus for treating and utilizing sewage, comprising a drying-cylinder revolubly mounted in a casing, in an inclined position, and having means for heating same in combination with a filtering-cylinder having its end resting in and rotated by said drying-cylinder, perforations in said cylinder, and means for supplying sewage to same, a strainer below the filtering-cylinder to receive the liquid sewage, a hopper at the upper end of the filtering-cylinder, and a conveyer from the discharge end of the drying-cylinder to the hopper for returning dried or partially-dried solid matter to the filtering-cylinder, as set forth.

7. An apparatus for treating and utilizing sewage, comprising a cylinder rotatably mounted in a casing, having at its sewage-receiving end an internal toothed gear in combination with a filtering-cylinder projecting within the end of said drying-cylinder, having an external toothed gear to engage with the internal toothed gear for the drying-cylinder and rotatable thereby, said filtering-cylinder having bearing-collars near each end, and wheels mounted in a frame upon which said cylinder revolves, an annular deflecting flange near the lower end, and a shell surrounding the upper end of the filtering-cylinder, means for supplying sewage to the upper end of the filtering-cylinder, perforations in the body thereof, and a strainer below the filtering-cylinder to receive the liquid from said cylinder, as set forth.

8. An apparatus for treating and utilizing sewage, comprising a drying-cylinder revolubly mounted in an inclined position in a casing, having in combination therewith a filtering-cylinder projecting within the upper end of the drying-cylinder, and rotated thereby at a greater rate of speed than the drying-cylinder, and having also means for receiving sewage, and discharging same into said cylinder.

In testimony whereof I affix my signature in presence of two witnesses.

ROBERT J. G. WOOD.

Witnesses:
J. S. ZERBE,
LOUIS SCHMITD.